May 3, 1949.  W. H. BLISS  2,469,063
PAN-TILT TRIPOD HEAD
Filed Sept. 8, 1947  2 Sheets-Sheet 1
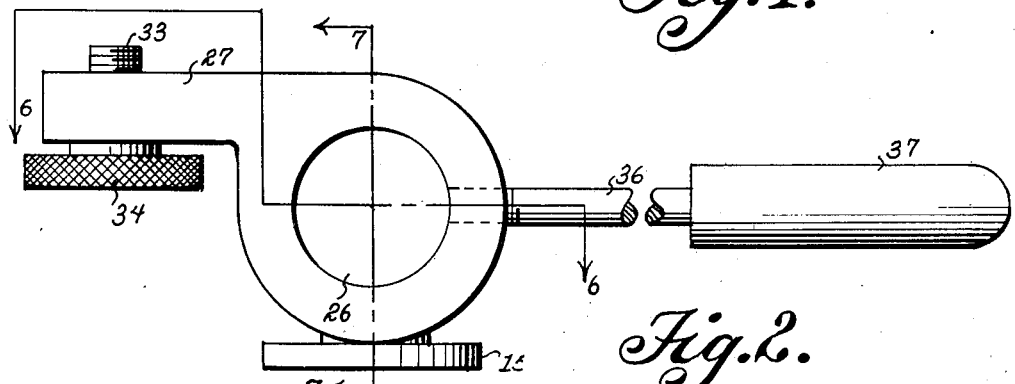
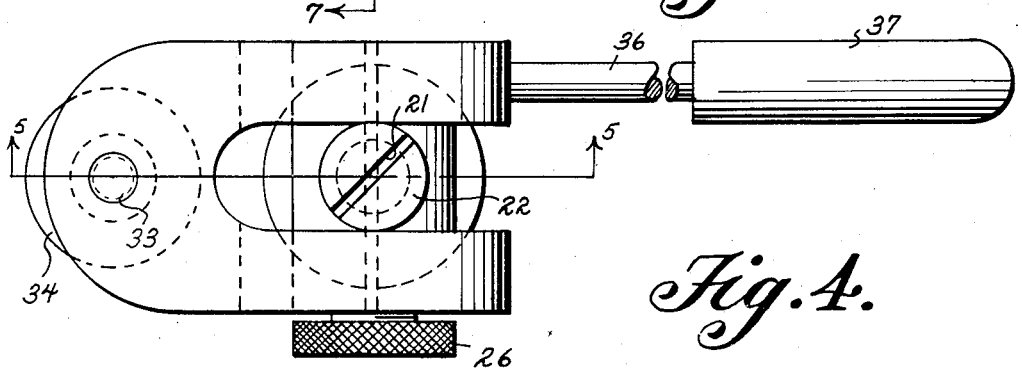
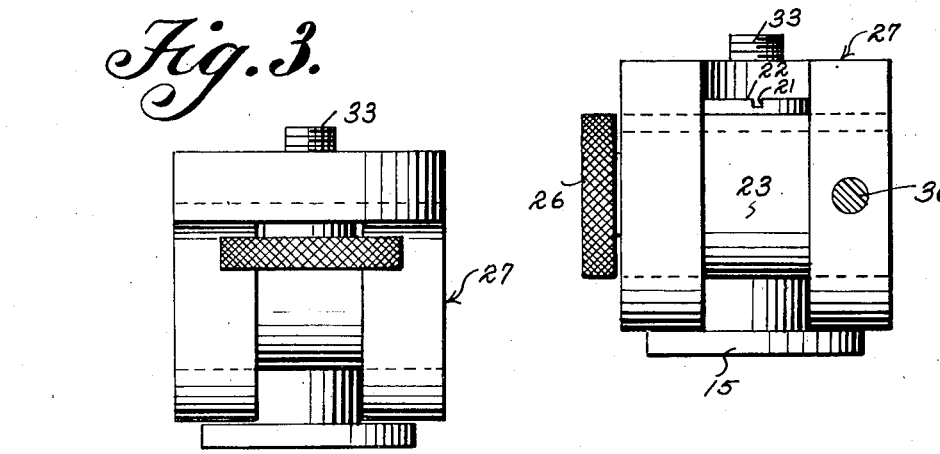
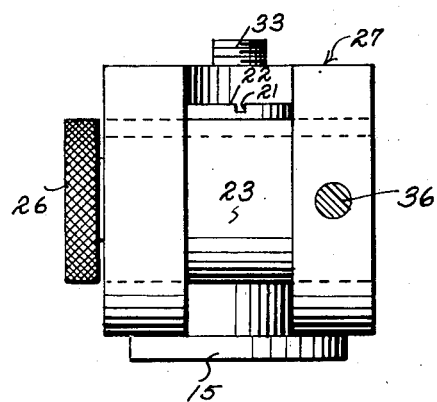
INVENTOR.
William H. Bliss
BY Victor J. Evans & Co.
ATTORNEYS May 3, 1949.  W. H. BLISS  2,469,063
PAN-TILT TRIPOD HEAD
Filed Sept. 8, 1947  2 Sheets-Sheet 2
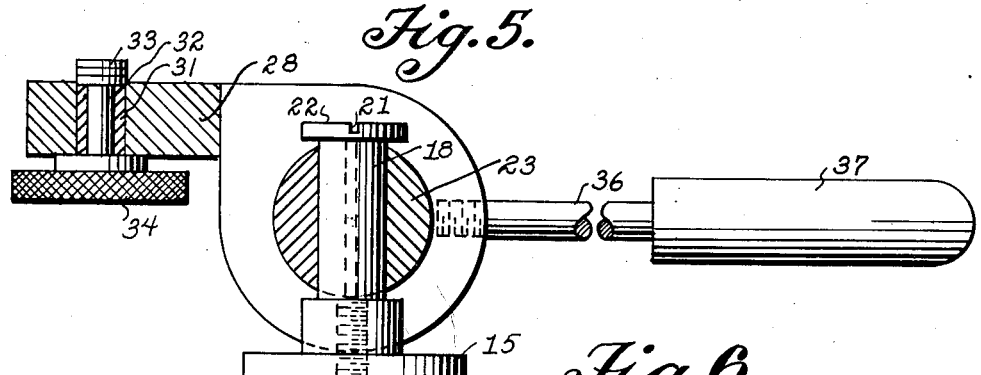
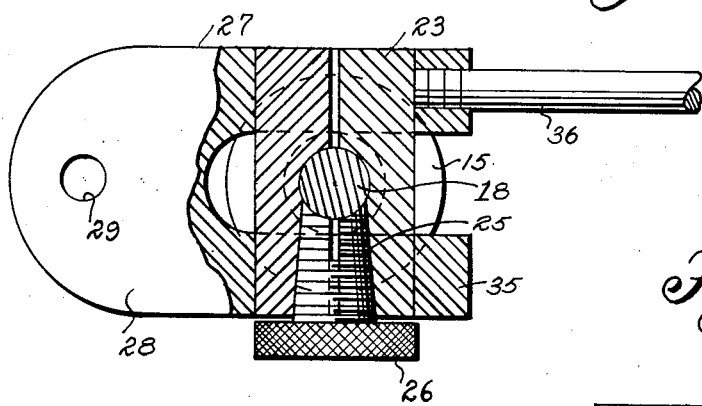
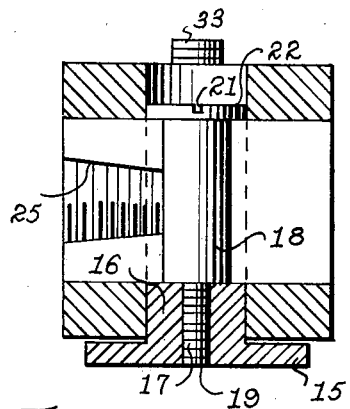
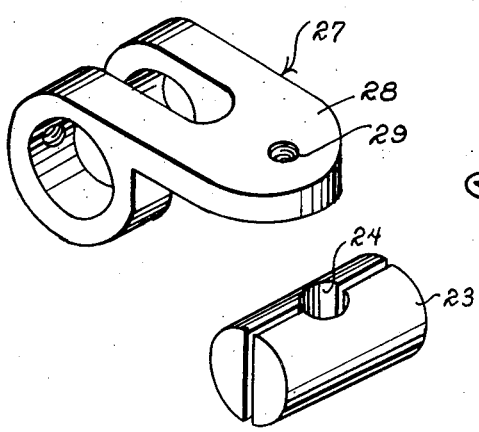
INVENTOR.
William H. Bliss
BY Victor J. Evans & Co.
ATTORNEYS Patented May 3, 1949

2,469,063

UNITED STATES PATENT OFFICE 2,469,063

PAN-TILT TRIPOD HEAD

William H. Bliss, Natchitoches, La.

Application September 8, 1947, Serial No. 772,663

2 Claims. (Cl. 248—183)

This invention relates to a tripod head for cameras and the like.

It is an object of the present invention to provide a tripod head which has a minimum of parts and which can be quickly and easily adjusted to a view finding position with a camera and which is adapted easily and quickly to permit merely the adjustment of the head support for the camera about a vertical axis and wherein the movement of the head can be dampened to give uniform turning movement while taking the picture.

Other objects of the present invention are to provide a tripod head which can turn about a vertical axis about 360 degrees and which can pivot at a horizontal axis of nearly 70 degrees, which is of simple construction, inexpensive to manufacture and efficient in operation.

For a better understanding of the invention, reference may be had to the following detailed description taken in connection with the accompanying drawing, in which Fig. 1 is a side elevational view of the tripod head embodying the features of the present invention, Fig. 2 is a top plan view, Fig. 3 is a front elevational view, Fig. 4 is a rear elevational and sectional view taken on line 4—4 of Fig. 2, Fig. 5 is a longitudinal cross-sectional view taken generally on line 5—5 of Fig. 2, Fig. 6 is a transverse cross-sectional view taken generally on line 6—6 of Fig. 1, Fig. 7 is a cross-sectional view, in elevation, taken on line 7—7 of Fig. 1, Fig. 8 is a perspective view of the camera support element, Fig. 9 is a perspective view of the split pivot forming the horizontal pivot for the camera support.

Referring now to the figures, 15 represents a base by which the head may be attached to a tripod. This base has an upwardly extending portion 16, Fig. 7, having a central threaded bore 17 adapted to receive a fastening screw 18 having a threaded portion 19 engaging with the bore 17. The fastening screw 18 serves as the vertical pivot post. The fastening screw 18 has a slot 21 in its head 22 for receiving a screw driver. Fitted onto the vertical fastening screw 18 is a split pivot 23 formed of separable parts having opposing grooves 24 to fit about the vertical screw 18. In one end of the split horizontal pivot are threaded portions 25 for receiving a locking screw 26 serving to expand the split pivot 23 whereby to lock camera support 27 against tilting movement upon the pivot support 23. The camera support 27 has a forwardly extending portion 28 with a vertically extending hole 29 therein adapted to tightly retain a bearing sleeve 31, Fig. 5, through which is extended a clamping or fastening screw device 32 having a threaded portion 33 adapted to enter a camera to fix it to the camera support and a knurled knob 34.

The rear of the camera support 27 has loop portions 35 for receiving the pivot support parts. Through one loop 35 there is threaded a rod 36 having a handle 37 thereon. This rod will engage the split pivot shaft 23 to urge its parts tightly against the vertical screw 18 whereby to prevent swinging movement about a vertical axis and at the same time to lock the camera support against tilting adjustment on the split pivot 23.

When it is desired to retain the camera support 27 against tilting movement while moving the same about a vertical axis the screw 26 is tightened to expand the split pivot shaft to fix the same to the camera support 27. Thereafter the rod 36 may be loosened and used to sling the camera support about a vertical axis and upon the screw pivot 18.

It should now be apparent that a full turn of the camera support can be had upon the screw pivot 18 and that the camera support can be tilted on a horizontal axis through seventy degrees.

While various changes may be made in the detail construction, it should be understood that such changes shall be within the spirit and scope of the present invention as defined by the appended claims.

I claim:

1. In a tripod head having a base and a vertically-extending pivot removably secured to said base the improvement comprising, a split horizontal pivot shaft fitted about the vertical pivot and having grooves to receive the same, a camera support connected to the horizontal split pivot and adapted to have a camera secured to the same, and a handle rod entering the camera support to simultaneously fix the camera support to the split horizontal pivot and the split horizontal pivot parts to the vertical pivot, and said split horizontal pivot having means for expanding the same to fix the camera support to the horizontal pivot independently of the handle rod whereby upon loosening the handle rod, the camera support may be swung about the vertical pivot in a horizontal plane.

2. The improvements in a tripod head as defined in claim 1 wherein said means for fixing the split horizontal pivot to the camera support comprising tapered internal threaded portions in one end of the horizontal pivot and a tapered screw adjustable on the portions to spread or release the horizontal split pivot parts.

WILLIAM H. BLISS.

REFERENCES CITED

The following references are of record in the file of this patent:

UNITED STATES PATENTS

| Number | Name | Date |
|---|---|---|
| 2,143,606 | Mooney | Jan. 10, 1939 |
| 2,226,827 | Moore | Dec. 31, 1940 |
| 2,261,426 | Willcox | Nov. 4, 1941 |